US012769854B2

(12) United States Patent
Xiao et al.

(10) Patent No.: US 12,769,854 B2
(45) Date of Patent: Oct. 20, 2026

(54) BOUNDED DEVICE CONTRIBUTION DIFFERENTIAL PRIVACY

(71) Applicant: Bytedance Technology Ltd., Grand Cayman (KY)

(72) Inventors: Yingtai Xiao, Culver City, CA (US); Jian Du, Culver City, CA (US); Shikun Zhang, Culver City, CA (US); Wanrong Zhang, Culver City, CA (US); Qiang Yan, Beijing (CN)

(73) Assignees: Bytedance Technology Ltd., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/011,305

(22) Filed: Jan. 6, 2025

(65) Prior Publication Data

US 2026/0195465 A1 Jul. 9, 2026

(51) Int. Cl.
*G06F 21/60* (2013.01)

(52) U.S. Cl.
CPC .................................. *G06F 21/606* (2013.01)

(58) Field of Classification Search
CPC ..................................................... G06F 21/606
See application file for complete search history.

(56) References Cited

U.S. PATENT DOCUMENTS 10,110,635 B1 * 10/2018 Hussain .................. G06F 21/53
10,530,823 B2 * 1/2020 Johnson ................ H04M 15/70
11,271,909 B2 * 3/2022 Tidwell ............... G06F 21/6254
11,805,416 B2 * 10/2023 Liu .......................... H04L 9/30
2019/0207815 A1 * 7/2019 Kirner ................ H04L 41/0813

(Continued)

FOREIGN PATENT DOCUMENTS

WO WO 2019/199366 A1 10/2019

OTHER PUBLICATIONS

Ayala-Gomez et al., "Show me the Money: Measuring Marketing Performance in F2P Games using Apple's App Tracking Transparency Framework," In Proceedings of the 28th ACM SIGKDD Conference on Knowledge Discovery and Data Mining, Washington D.C., USA, Aug. 14-18, 2022, 6 pages.

(Continued)

*Primary Examiner* — Viral S Lakhia
(74) *Attorney, Agent, or Firm* — Fish & Richardson P.C.

(57) ABSTRACT

Methods, systems, and apparatus, including computer programs encoded on computer storage media, for using differential privacy device bounded contributions. One of the methods includes maintaining, for each time period from a set of time periods, action data for a device; determining whether a current time period satisfies a time period criterion; selecting, using a result of the determination whether the time period criteria is satisfied and from a set of two or more bound generation processes, a bound generation process for the device; computing, using the bound generation process, a bound on an amount of data from the action data and for the device to transmit to a downstream system; selecting, using the action data for the device, a responsive data set with a size defined by the bound; and transmitting, to the downstream system, the responsive data set with the size defined by the bound.

20 Claims, 3 Drawing Sheets

(56) References Cited

U.S. PATENT DOCUMENTS

| | | | | |
|---|---|---|---|---|
| 2022/0141299 | A1* | 5/2022 | Deo | H04L 12/4641 709/223 |
| 2023/0199628 | A1* | 6/2023 | Oliveira | G06F 9/45558 370/329 |
| 2024/0314031 | A1* | 9/2024 | Sarukkai | H04L 41/0813 |
| 2024/0378050 | A1* | 11/2024 | Laigle | G06F 8/71 |

OTHER PUBLICATIONS

Chan et al., "Private and continual release of statistics," ACM Transactions on Information and System Security (TISSEC), Nov. 2011, 14(3), 24 pages.

Dong et al., "Continual observation under user-level differential privacy," In Proceedings of the 2023 IEEE Symposium on Security and Privacy (SP), May 21-25, 2023, San Francisco, CA, USA, 2190-2207.

Dwork et al., "Differential privacy under continual observation," In Proceedings of the Forty-Second ACM Symposium on Theory of Computing, Jun. 5-8, 2010, Cambridge, Masasschusetts, USA, 715-724.

Pfeiffer III, et al., "Masked LARk: Masked Learning, Aggregation and Reporting workflow," CoRR, submitted on Oct. 2021, arXiv:2110.14794, 12 pages.

Rosales et al., "Post-click conversion modeling and analysis for non-guaranteed delivery display advertising," In Proceedings of Fifth ACM International Conference on Web Search and Data Mining, Feb. 8-12, 2012, Seattle, Washington, USA, 293-302.

Wikipedia.org [online], "Laplace distribution," Oct. 2004, retrieved on Dec. 2024, retrieved from URL<https://en.wikipedia.org/w/index.php?title=Laplace_distribution&oldid=1259549988>, 8 pages.

Xiao et al., "Click Without Compromise: Online Advertising Measurement via Per User Differential Privacy," CoRR, submitted on Jun. 2024, arXiv:2406.02463, 17 pages.

Extended European Search Report in European Appln. No. 25223314.3, mailed on Jun. 9, 2026, 6 pages.

Gillenwater et al., "Differentially Private Quantiles," CoRR, Submitted on Sep. 20, 2021, arXiv:2102.08244v3, 26 pages.

* cited by examiner

BOUNDED DEVICE CONTRIBUTION DIFFERENTIAL PRIVACY

BACKGROUND

Various systems can communicate over a network. For instance, a client device can send data to a server device, e.g., a cloud computing server. The data communicated over the network can be encrypted to increase data privacy, data security, or both.

SUMMARY

In general, one aspect of the subject matter described in this specification can be embodied in methods that include the actions of maintaining, for each time period from a set of time periods, action data for a device; determining whether a current time period satisfies a time period criterion; selecting, using a result of the determination whether the time period criteria is satisfied and from a set of two or more bound generation processes, a bound generation process for the device; computing, using the bound generation process, a bound on an amount of data from the action data and for the device to transmit to a downstream system; selecting, using the action data for the device, a responsive data set with a size defined by the bound; and transmitting, to the downstream system, the responsive data set with the size defined by the bound.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, the method can include receiving a query that includes an objective function; computing a scale using the objective function and the bound; and generating, for the action data and using the scale, noise data for the device. Selecting the responsive data set can include selecting the data set from a combination of the action data for the device and the noise data for the device.

In some implementations, receiving the query can include receiving, from the downstream system and prior to receiving the action data for the device, the query that includes the objective function and a duration for use of the objective function, the duration including the set of time periods. Transmitting the responsive data set with the size defined by the bound can include transmitting, to the downstream system and for the current time period from the set of time periods, the responsive data set that includes the noise data for the device as part of a continuous stream of data to the downstream system that is responsive to the query.

In some implementations, at least some of the action data for the device can include data generated by the device given interactions with different applications, websites, or both.

In some implementations, computing the bound on the amount of data from the action data to transmit to the downstream system can include: computing a number of records in a corresponding action data set; determining whether the number of records satisfies a maximum number of records; and selecting, as the bound on the amount of data from the action data to transmit to the downstream system, the number of records or the maximum number of records using a second result of the determination whether the number of records satisfies the maximum number of records.

In some implementations, computing the bound on the amount of data from the action data to transmit to the downstream system can include: for each device in a plurality of devices for which an action data database maintains a corresponding action data set, computing a number of records in the corresponding action data set; computing, for at least some devices from the plurality of devices, a probability using the number of records for the corresponding device and a second number of records for a different device from the plurality of devices; determining, using the probability and for the device, whether to sample a different number of records for a different device or the number of records; and selecting, as the bound on the amount of data from the action data to transmit to the downstream system, the number of records or the different number of records using a second result of the determination whether to sample the different number of records for the different device. The plurality of devices can include the device. The action data database can include, e.g., maintain, the action data.

In some implementations, computing the probability can use the number of records for the corresponding device, the second number of records for a different device from the plurality of devices, and a quantile percent value.

In some implementations, determining, using the probability and for the device, whether to sample the different number of records for the different device or the number of records can include determining to not sample the different number of records for the different device. Selecting the number of records or the different number of records can include selecting, as the bound on the amount of data from the action data to transmit to the downstream system, the number of records in response to determining to not sample the different number of records for the different device.

In some implementations, determining, using the probability and for the device, whether to sample the different number of records for the different device or the number of records can include determining to sample the different number of records for the different device or the number of records. Selecting, as the bound on the amount of data from the action data to transmit to the downstream system, the number of records or the different number of records can include uniformly sampling the different number of records or the number of records in response to determining to sample the different number of records for the different device or the number of records.

In some implementations, computing the bound on the amount of data from the action data to transmit to the downstream system can include: using a threshold, a noisy threshold, and a current bound, determining whether to compute a new bound instead of using the current bound; and selectively using the current bound or the new bound using a second result of the determination whether to compute the new bound instead of using the current bound.

In some implementations, the threshold can indicate a maximum number of bound update recommendations.

In some implementations, the method can include computing, using at least the current bound, an average number of records in the action data for the device across a plurality of time periods from the set of time periods; computing a number of devices with a corresponding number of records for the current time period that satisfies the average number of records; determining whether to recommend an increase change to the bound using at least the threshold, the noisy threshold, and the number of devices; and determining whether to recommend a decrease change to the bound using at least the threshold, the noisy threshold, and the number of devices. Determining whether to compute the new bound instead of using the current bound can use a third result of the determination of whether to recommend an increase change to the bound and a fourth result of the determination whether to recommend a decrease change to the bound.

In some implementations, determining whether to compute the new bound instead of using the current bound can include determining that the third result has the same value as the fourth result. Selectively using the current bound or the new bound can include selecting the average number of records in the action data for the device as the new bound.

In some implementations, determining whether to compute the new bound instead of using the current bound can include determining, using the third value and the fourth value, to compute the new bound by increasing the bound. Selectively using the current bound or the new bound can include computing the new bound using the average number of records in the action data for the device and a scale value greater than one.

In some implementations, determining whether to compute the new bound instead of using the current bound can include determining, using the third value and the fourth value, to compute the new bound by decreasing the bound. Selectively using the current bound or the new bound can include computing the new bound using the average number of records in the action data for the device and a scale value less than one.

In some implementations, determining whether to recommend an increase change to the bound or determining whether to recommend a decrease change to the bound can include: determining whether a current number of changes to the bound satisfies a bound change threshold; and determining to recommend changing the bound or recommend not changing the bound using a fifth result of the determination whether the current number of changes to the bound satisfies the bound change threshold.

In some implementations, determining whether to recommend an increase change to the bound or determining whether to recommend a decrease change to the bound can include: determining whether a noisy query satisfies a threshold; and determining to recommend changing the bound or recommend not changing the bound using a fifth result of the determination whether the noisy query satisfies the threshold.

In some implementations, determining whether to recommend an increase change to the bound or determining whether to recommend a decrease change to the bound can use at least part of a privacy budget.

The subject matter described in this specification can be implemented in various implementations and may result in one or more of the following advantages. In some implementations, the systems and methods described in this specification can provide formal privacy guarantees compared to other systems given use of the one or more bound generation processes. In some implementations, the systems and methods described in this specification can increase data privacy, data security, or both, compared to other systems by generating noise data for a device, e.g., and including that noise data in a continuous stream of data. In some implementations, the systems and methods described in this specification can increase data privacy, data security, or both, for action data from different applications, websites, or both, by processing data on a device level instead of an action or event level, e.g., by selecting a bound generate process for the device, computing a bound on an amount of data from the action data and for the device to transmit to a downstream system, other device level operations, or any combination of these. For instance, by operating on data that has multi-touch attribution on a device level, the systems can increase data privacy, data security, or both. In some instances, selecting the bound generation process, determining whether to compute a new bound, or both, can reduce an amount of privacy budget consumed during a multi-touch attribution differential privacy process.

In some implementations, the systems and methods described in his specification can increase data accuracy compared to other systems, e.g., while providing data privacy, data security, or both, guarantees. For example, the systems and methods can have an improved accuracy, e.g., with accuracy gains ranging from 30% to 90%, over existing methods while maintaining robust user privacy protection, e.g., by selecting a bound generation process for the device; computing a bound on an amount of data from the action data and for the device to transmit to a downstream system; using a threshold, a noisy threshold, and a current bound, determining whether to compute a new bound instead of using the current bound; or any combination of these. The increased data accuracy can improve an accuracy of data processing performed by downstream systems.

In some implementations, the systems and methods described in this specification can help prevent potential injection attacks, e.g., against downstream systems. For instance, by computing a bound on an amount of data from the action data and for the device to transmit to a downstream system, a device can have a reduced likelihood of being used for a potential injection attack. Specifically, a malicious person might attempt to create a large number of accesses in an effort to introduce bias into a downstream model. By implementing this bound, there can be an increased likelihood that any person's contributions remain limited, e.g., preventing any single device or person from exerting excessive influence on the model.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some devices can transmit action data to downstream systems. The action data can be any appropriate type of data, such as data indicating one or more actions the device performed during a browsing session. Some examples of this action data can include actions related to interactions with a webpage or an application, e.g., interactions with advertisements. However, provision of this, e.g., raw, action data can potentially raise concerns about privacy, data security, or both. For instance, a downstream system that has access to raw data can determine the particular actions performed by a particular device.

To increase privacy, security, or both, for action data, a system, e.g., a central modification system, can modify the action data. For example, the system can add noise to the action data; bound the amount of action data, e.g., contributions, for the device; or a combination of both. The system can use one or more differential privacy operations to add noise to the action data. In some implementations, the system can add noise using the bound of the amount of action data for the device.

Since the action data can be a continuous data stream, e.g., such as for advertisement measurement, continuous processing of the action data can consume a differential privacy budget over time. For instance, as the system transmits action data to a downstream system, or updates a bound for the action data, one or both of these operations can consume some of the differential privacy budget. To reduce use of the differential privacy budget, the system can determine when to perform these actions. For example, the system can determine when to update the bound for the action data, reducing consumption of the differential privacy budget and potential privacy, security, or both, data loss.

The systems and methods described in this specification, e.g., that use action data, can be used for any real-time database that provides aggregated data from multiple devices, e.g., each of which can be operated by a respective user. For instance, the real-time database can be for social media trends monitoring, real-time traffic monitoring and navigation systems, or both. Aggregated data can be used to identify trends such as popular hashtags, viral content, sentiment analysis, or any combination of these. Aggregated data can be analyzed to identify traffic patterns, detect congestion, report accidents, generate navigation directions, or any combination of these.

Figure 1:
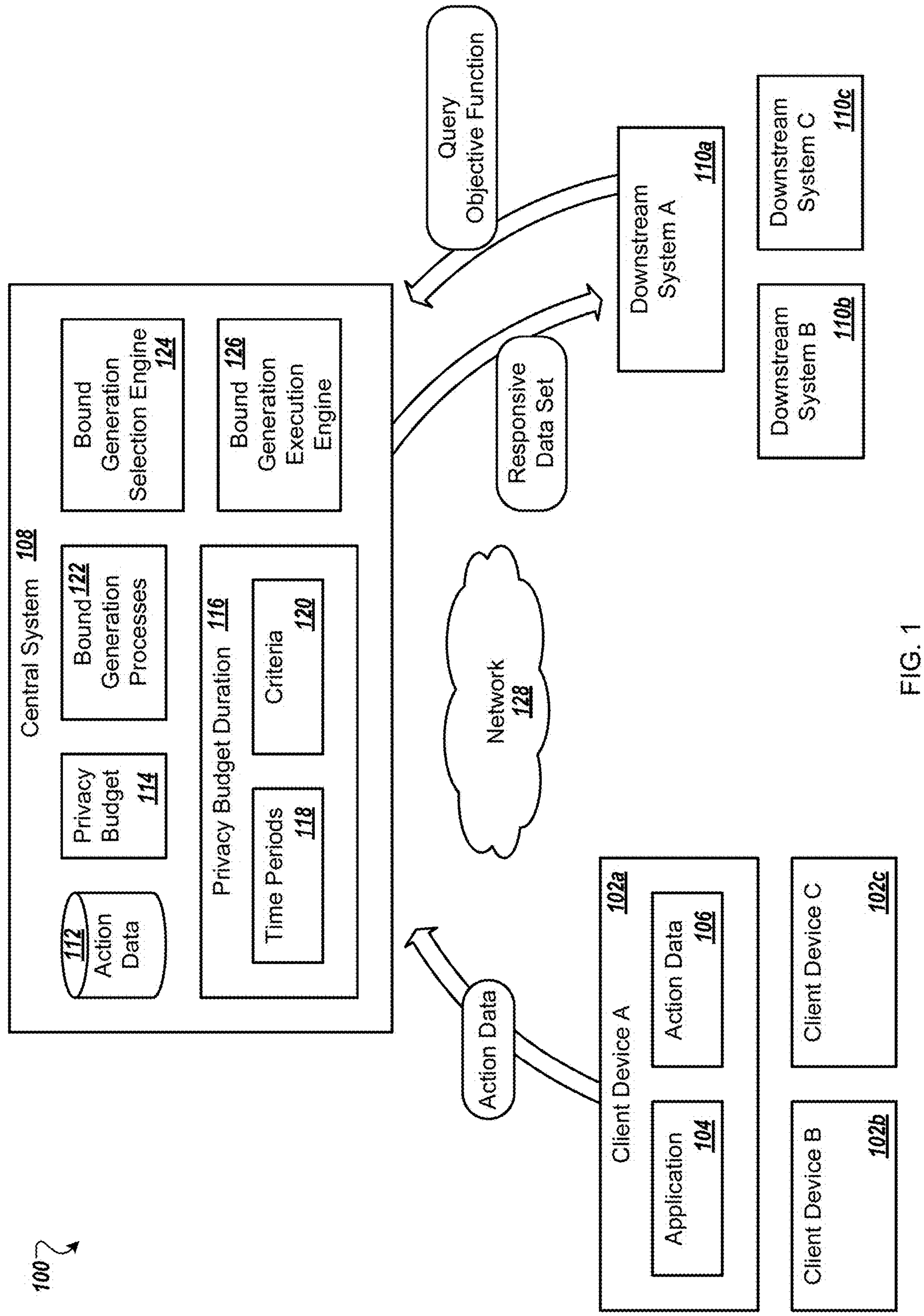
FIG. 1 depicts an example environment in which a central system uses device level, e.g., user level, differential privacy.

FIG. 1 depicts an example environment 100 in which a central system 108 uses device level, e.g., user level, differential privacy. The central system 108 can process action data 106, 112 that is generated as part of a multi-touch attribution process. If the action data were processed individually, e.g., for each action such as for a selection of a link or view of a product, there might be inadvertent leakage of data when a change of data from one source, e.g., application or website, does not align with data from another source. The central system 108 can process the action data continuously, e.g., for distinct time periods such as days within a processing duration. Since typical continuous reporting consumes a differential privacy budget 114 over time, degrading accuracy of the transmitted data, by using the operations described in more detail below, the central system 108 can reduce privacy budget consumption enabling the use of privacy budget across the entire duration, e.g., increases data privacy, data security, or both.

One or more client devices A-C 102*a-c* each execute one or more applications 104. The applications 104 can be any appropriate types of applications, such as a web browser, a native application, e.g., developed by an operating system provider of the operating system executing on the respective device, a proprietary application, e.g., developed by an entity other than the operating system provider, or any combination of these.

As the client devices A-C 102*a-c* execution the application 104, the client devices A-C 102*a-c* can generate respective action data 106. For instance, the client device A 102*a* can generate action data 106 that indicates interactions with a web browser executing on the client device A 102*a*.

The action data 106 can be any appropriate type of action data. For instance, the action data 106 can indicate selection of a uniform resource identifier ("URI"), hovering over an image, other appropriate types of actions, or any combination of these. As noted below, the device A 102*a* and the other devices B-C 102*b-c* can opt-in to provision of the action data to the central system 108.

The client device A 102*a* transmits the action data 106, or at least some of the action data 106, to the central system 108. The client device A 102*a* can transmit the action data 106 in a continuous stream, e.g., as the action data 106 is generated by the client device A 102*a* such as during a web browsing session.

The central system 108 receives the action data 106 from various ones of the client devices A-C 102*a-c*. The central system 108 stores, and then maintains, the action data 112 in a database.

Prior to receipt of the action data, the central system 108 can receive a query, an objective function, or both, from one of the downstream systems A-C 110*a-c*. The query can be for a campaign related to tracking various types, combinations, or both, of action data. For instance, the query can specify a duration of time to which the query applies, a request for a number of conversions each time period, e.g., day, a request for a number of conversions for a range of time periods, e.g., multiple days, another appropriate type of query, or any combination of these. The duration of time includes multiple different time periods. For instance, if the duration is a week or a month, the time periods can be the days within that week or month, respectively.

The central system 108 can receive with the query an objective function. The objective function can be any appropriate type of objective function, e.g., associated with the query. Some example objective functions can include a minimization of a root mean squared error or a minimization of a maximum variance of queries.

The central system 108 maintains data for the query. For instance, the central system 108 can maintain data identifying the query, the objective function, the privacy budget 114, a privacy budget duration 116, e.g., the duration of time to which the query applies, or any combination of these. The privacy budget 114 can be any appropriate type of privacy budget, e.g., as used for differential privacy.

As noted above, the privacy budget duration 116 can have any appropriate length. The central system 108 can maintain data that identifies multiple time periods 118 within the privacy budget duration 116. The data that identifies the time periods 118 can be any appropriate type of data. For example, the data that identifies the time periods 118 can identify particular time periods, e.g., the specific days to which the query applies, or a length for the time periods, e.g., a day or 24 hours.

The privacy budget duration 116 can include one or more criteria 120. The central system 108 can use at least some of the one or more criteria 120 to determine a bound generation process from multiple bound generation processes 122 to use when generating a data set responsive to the query for transmission to one of the downstream systems A-C 110*a-c*. The recipient downstream system A-C 110*a-c* can be the same system from which the central system 108 received the query or a different system, e.g., identified as part of the data that included the query.

As part of a responsive data set generation process, a bound generation selection engine 124, included in the central system, can select one of the bound generation processes 122 for use during a time period from the time periods 118. The bound generation selection engine 124 can select the bound generation process using any appropriate operations. For instance, the bound generation selection engine 124 can use at least one of the criteria 120 to select one of the bound generation processes 122. When the time periods are days and the bound generation processes 122 include a first bound generation process and a second bound generation process, the criteria can be five. During these examples, the bound generation selection engine 124 can select the first bound generation process for days one to four during the privacy budget duration 116 and select the second bound generation process for days five to the end of the privacy budget duration 116.

A bound generation execution engine 126, included in the central system 108, can execute the selected bound generation process. For example, as described in more detail below, the central system 108 can use one or more bounds on a number of records in the action data that can be included in a responsive data set transmitted to a downstream system 110*a-c*. By using the bounds, the central system 108 can increase data security, data privacy, or both. The central system 108 can use the same bound for at least some of the time periods 118 during the privacy budget duration, different bounds for at least some of the time periods 118, or any combination of both.

For instance, the bound generation execution engine 126 can determine whether to update a data bound for a time period 118. The bound generation execution engine 126 can use the selected bound generation process to determine whether to update the bound, as described in more detail below. The bound generation execution engine 126 can use any appropriate type of data during execution, such as historical bounds used for prior time periods 118 during the privacy budget duration 116. Upon determining to update the data bound for the time period 118, the bound generation execution engine 126 computes the updated bound.

The central system 108 can use the bound, whether updated or not, to generate noise for the responsive data set for transmission to the downstream system 110*a-c* for the time period. For instance, for the time period 118, e.g., a current time period, the central system can add random noise $z_i$ to the responsive data set for transmission. The noise can be any appropriate type of noise, e.g., Gaussian noise. The central system 108 can generate a noise data $\tilde{x}_i=x_i+z_i$, where $$z_i \sim N(0, \sigma_i^2)$$

is a Gaussian random variable. The random noise $z_i$ can have a mean of zero, a variance $$\sigma_i^2$$

for a scale parameter σ, or both.

The central system 108 can initialize the scale parameter σ, or multiple scale parameters $\sigma_1, \ldots, \sigma_n$, in any appropriate manner. When the central system uses multiple scale parameters 1 to n, each of the scale parameters can be for a different one of the time periods 118, e.g., when there are n time periods 118. The central system 108 can initialize the scale parameters σ using one or more of the query, the objective function, an initial per-day contribution $r_i$ for i=1, . . . n, or any combination of these. By using the query, the objective function, or both, the central system 108 can provide flexibility for different goals, e.g., different campaign goals.

After initialization of the scale parameter σ, the central system 108 can update the scale parameter σ. For instance, the central system 108 can determine whether to update, update, or both, the scale parameter σ for at least some of the time periods 118, e.g., for all of the time periods 118. The central system 108 can update the scale parameter σ using an initialized scale parameter $\overline{\sigma}_i$, an initial per-day contribution $r_i$, an updated bound, e.g., per day contribution, or any combination of these. By updating the scale parameter σ for at least some of the time periods 118, the central system can be more adaptive to the query, the action data received from the client device 102, changes in the bound, or any combination of these, than other systems.

The central system 108 can initialize the initial per-day contributions, or bound, $r_i$ using any appropriate process. For example, the central system 108 can estimate a contribution limit r; that indicates, for each time period 118 *i* a maximum, or bound, on the number of records to include in the action data for the corresponding device. Although the examples described with respect to devices, similar actions can be performed for an account, a user, or any combination of these, including combinations that might include a device.

Table 1, below, provides an example algorithm with pseudo-code for initializing the scales, selecting one of the bound generation processes 122, updating the scale, adding noise, and generating a query answer $y_i$, e.g., a responsive data set that includes the query answer $y_i$. In Table 1, the query is $q_\theta$, e.g., for a query $q_\theta$ received from a downstream system θ. The central system can use a criterion $k_1$ to select between multiple bound generation processes 122, e.g., between a PrivateQuantile bound generation process and a UpdateBoundSVT bound generation process. The central system 108 can perform at least part of the algorithm for a device $d_m$ from which the central system 108 received data for the data set D of action data 112. The device $d_m$ can have corresponding action data $D_m$ from the data set D. The data set D can have action data for a time period i, represented as $D_i$.

In Table 1, operation 5 can be performed across different time periods 118 *i* for the privacy budget duration 116*n*. Operation 6 can be performed to select one of the bound generation processes 122, e.g., by the bound generation selection engine 124. Operations 7 or 9 can be performed by the bound generation execution engine 126, e.g., to determine whether to update the bound, generate a new bound, or both. Operation 12 can be performed to select data from the action data 112 for a device, e.g., the device A 102*a* $d_m$, given the bound. Operation 13 can be performed to update the scale. Operation 14 can be performed to generate noise data. Operation 15 can be performed to generate the query answer, e.g., the responsive data set. The operations can be performed by any appropriate components in the central system 108.

TABLE 1

| Responsive Data Set Generation with Bounded Per Day Contributions | |
|---|---|
| 1: | Input: Target query $q_0$; initial per-day contribution bound $r_i$. $i = 1, \ldots, n$ |
| 2: | Output: Noisy query answer |
| 3: | scale_list = InitScales( ) |
| 4: | bound_list = [ ] |
| 5: | For i in range(n) do |
| 6: | if $i < k_i$ then |
| 7: | bound = PrivateQuantile($D_i$, percent) |
| 8: | else |
| 9: | bound = UpdateBoundSVT($D_i$) |
| 10: | end if |
| 11: | Store the bound: bound_list.append(bound) |
| 12: | Clip data: x[i] = Clip($D_i$, bound) |
| 13: | Update scale: $\sigma_i = \frac{\text{scale\_list}[i]}{r_i} * \text{bound}$ |
| 14: | Add noise to data: $\tilde{x}[i] = x[i] + N(0, \sigma_i^2)$ |
| 15: | Get query answer: $y_j = q_j^T \tilde{x}$ |
| 16: | end for |
| 17: | Return |

Table 2, below, provides an example first bound generation process, e.g., a PrivateQuantile Bound Generation Process. The central system 108 can use any appropriate process for the PrivateQuantile Bound Generation Process. The PrivateQuantile Bound Generation Process can be a process by which the central system estimates a contribution bound for a client device.

The central system 108 can use the first bound generation process to balance types of potential inaccuracy introduced into the responsive data set. These types of potential inaccuracy can include potential bias caused by the removal of records from a responsive data set for a device, e.g., caused by a small bound, noise caused by a high variance in the values of the responsive data set, e.g., caused by a large bound, or both. The use of a private quantile algorithm can balance one or more of these potential sources of inaccuracy for the responsive data set.

As part of the first bound generation process, the central system 108 can compute a bound for a device $d_m$ using the records generated by device $d_m$ and that are included in the action data 112. These records generated by the device $d_m$ and included in the action data can be represented as $D_m$. The central system 108 can compute the number of records for the device $d_m$ and select an appropriate private quantile as the device contribution bound for the corresponding time period 118.

In Table 2, below, q indicates a quantile percentage. The quantile percentage q can be a predetermined value, e.g., 99%.

The central system 108 can compute the bound c using any appropriate process. For instance, the central system can compute the bound c for the device $d_m$ using the records $D_m$ generated by the device $d_m$, the privacy budget 114 &, the quantile percentage q, a bounding parameter Λ, a number of devices h for which the central system 108 is performing privacy operations, a probability $p_m$, The number of devices h can be any appropriate number, e.g., a number of devices from which the central system 108 received action data for the query. As the central system 108 receives action data from additional devices, the number of devices h can change over time. The probability $p_m$ can represent the probability that a different bound is sampled, e.g., selected, for the device $d_m$.

TABLE 2

| PrivateQuantile Bound Generation Process | |
|---|---|
| 1: | Input: Input data set D; quantile percentage q; privacy budget ε; bounding parameter Λ; number of devices h |
| 2: | Output: The selected user contribution bound based on q quantile |
| 3: | X = [ ] with length h + 2 |
| 4: | for Each device $d_m$ in D do |
| 5: | $c_m \leftarrow$ the number of records from $d_m$ |
| 6: | X.append($c_m$) |
| 7: | end for |
| 8: | Sort X in ascending order. $X = [c_1, c_2, \ldots, c_h]$ |
| 9: | Replace $c_m > \Lambda$ in X with Λ. Define $c_0 = 0$ and $c_{h+1} = \Lambda$ |
| 10: | for i = 1 to h do |
| 11: | Set $p_m = (c_{m+1} - c_m)\exp\left(-\frac{\varepsilon\lvert m - qh\rvert}{2}\right)$ |
| 12: | end for |
| 13: | Sample an integer $m \in \{0, \ldots, h\}$ with probability $p_m / \left(\sum_{i=0}^{h} p_m\right)$ |
| 14: | $c \leftarrow$ uniformly sampled from $[c_m, c_{m+1}]$ |
| 15: | Return c |

Use of the first bound generation process, e.g., as described in Table 1 above, can consume some of the privacy budget each time it is used. As a result, the central system 108 generally might not use the first bound generation process for each of the time periods 118. This might occur when the number of records generated by a client device changes and changes to the bound might represent changes to the data or otherwise consume part of the privacy budget.

The central system 108 can use a second bound generation process for at least some of the time periods. The second bound generation process uses less privacy budget than the first bound generation process, e.g., might not consume any of the privacy budget in some instances. The central system 108 can use the second bound generation process to determine whether to update a bound. For instance, when the number of records for the device $d_m$ for a time period in the privacy budget duration 116 changes by an amount that satisfies a threshold φ, e.g., as an example criterion 120, the central system 108 can determine to update the current bound for the device $d_m$. When the number of records changes by an amount that does not satisfy the threshold φ, the central system 108 can determine to skip updating the current bound for the device $d_m$.

For example, since the contribution bound can be stable for various adjacent time periods in the privacy budget duration 116, e.g., most of the time, the central system might not need a quantile estimate for the number of records for each of the time periods 118. As a result, the central system can keep the bound c as a constant and update the bound c when there's a significant change in the number of records for the corresponding device between sequential time periods 118. This can reduce an amount of the privacy budget consumed when generating the responsive data sets.

One example of the second bound generation process, UpdateBoundsSVT, can be a sparse vector technique ("SVT") as shown in the algorithm of Table 3, below. The second bound generation process, e.g., CheckUpdate, can use a process that determines whether to recommend updating the bounds, as shown in Table 4, below.

In Table 3, the action data records during time period i, e.g., day i, from the action data 112 can be represented by $D_i$. NumAbove($D_i$, $\tau_i$) can indicate a process that determines a number of devices that have more than $\tau_i$ records, in corresponding action data 112, during time period i.

The central system 108 can compute the record value $\tau_i$ in any appropriate manner. The central system 108 can set the value of the record average $\tau_i$ to be the average number of records for the devices $d_m$ in the data $D_i$. In some instances, the central system 108 can use the first bound generation process, e.g., a differentially private quantile process, to compute the bound for the first $k_1$ time periods, e.g., as described above. For time periods $i>k_1$, the central system 108 can compute an average, for the record value $\tau_i$, of the previous k bounds using Equation (1), below. The number of the previous k bounds can be determined in any appropriate manner. For instance, the number of the previous k bounds can be predetermined, selected, or both.

$$\tau_i = \frac{1}{k}\sum\nolimits_{j=i-k}^{i-1} \tau_j \quad (1)$$

In some implementations, the central system 108 can execute multiple instances of the second bound generation process, e.g., in parallel or in series. For example, the central system 108 can run two parallel UpdateBoundsSVT processes to check whether to update the bound. The central system 108 can execute a first instance of the second bound generation process to determine whether to increase the bound, using increase parameters $T^{\uparrow}$, $s^{\uparrow}$, $\tilde{T}^{\uparrow}$, $count^{\uparrow}$, $\Sigma^{\uparrow}$, $$q_i^{\uparrow}.$$

The central system 108 can execute a second instance of the second bound generation process to determine whether to decrease the bound, using the decrease parameters $T^{\downarrow}$, $s_{\downarrow}$, $\tilde{T}^{\downarrow}$, $count^{\downarrow}$, $\varepsilon^{\downarrow}$, $$q_i^{\downarrow}.$$

In instances in which separate instances of the second bound generation process are executed, one process can include lines 7 and 8 from Table 3 and another process can include lines 9 and 10 of the process. One of the two processes or a general process can include lines 11 to 17 that use values, e.g., outputs, from the two processes to determine whether to update the bound and, if so, a way in which the bound should be updated.

As indicated below, T can represent a threshold; s can represent a scale, e.g., from the scale_list described in Table 1; $\tilde{T}$ can represent a noisy threshold, e.g., updated using the CheckUpdate process from Table 4, below; count represents the number of bound update recommendations made so far; $k_2$ represents the maximum number of bound update recommendations, e.g., a threshold to maintain the privacy budget $\varepsilon$; $\varepsilon^{\uparrow}$, and $\varepsilon^{\downarrow}$ represent an amount of the privacy budget $\varepsilon$ allocated to the corresponding portion of the bound generation process; and the query $q_i$ represents a value based on the NumAbove($D_i$, $\tau_i$) operation.

The central system 108 can use the noisy threshold $\tilde{T}$ to increase privacy, security, or both, instead of using only the threshold T. The central system 108 can initialize the noisy threshold $\tilde{T}$ at a combination of the threshold T and noise, e.g., a sum of the threshold T and noise. As shown in Tables 3 and 4, below, the central system 108 can change the noisy threshold $\tilde{T}$ when there is a change in the bound, e.g., with the noisy threshold $\tilde{T}$ being set as the combination of the threshold T and a new noise value, e.g., the sum of the two. The central system 108 can use any appropriate type of combination, e.g., any appropriate mathematical operator.

As shown in Table 3, one portion of the second bound generation process can determine whether to recommend increasing the bound. This portion can be represented by lines 7 and 8. For instance, in the first SVT, the central system 108 can use the query function $$q_i^{\uparrow} = NumAbove(D_i, \tau_i)$$

when $\tau_i$ is the default contribution bound as computed using line 6. The central system 108 can determine whether $\tau_i$*$s^{\uparrow}$ is likely a better contribution bound than the current bound for scaling parameter $s^{\uparrow}>1$. If $$q_i^{\uparrow}$$

satisfies a first predefined threshold $T^{\uparrow}$, e.g., is greater than the predefined threshold $T^{\uparrow}$, updating the bound to $\tau_i$*$s^{\uparrow}$ can reduce bias in the resulting data set generated by the central system 108. As a result, the central system 108 can use $\tau_i$*$s^{\uparrow}$ as the new bound for time period i.

Another portion of the second bound generation process can determine whether to recommend decreasing the bound. This portion can be represented by lines 9 and 10. For instance, in the second SVT, the central system 108 can use the query function $$q_i^{\downarrow} = NumAbove(D_i, \tau_i) - \left(D_i, \tau_i * s^{\downarrow}\right)$$

when $\tau_i$ is the default contribution bound as computed using line 6. The central system 108 can determine whether $\tau_i$*$s^{\downarrow}$ is likely a better contribution bound than the current bound for scaling parameter $s^{\uparrow}<1$. If $$q_i^{\uparrow}$$

satisfies a second predefined threshold T', e.g., is greater than the predefined threshold $-T^{\downarrow}$, updating the bound to $\tau_i$*$s^{\downarrow}$ can reduce the variance in the resulting data set generated by the central system 108. As a result, the central system 108 can use $\tau_i$*s' as the new bound for time period i.

In some instances, the central system 108 can use both increasing and decreasing bound recommendations to determine the bound or whether to update the bound. When the central system 108 determines that both of the above predefined thresholds $T^{\uparrow}$, $T^{\downarrow}$ are satisfied, the central system can determine to use $\tau_i$ as the bound. When the central system 108 determines that neither of the above predefined thresholds $T^{\uparrow}$, $T^{\downarrow}$ are satisfied, the central system can determine to skip updating the bound.

The initial values of the predefined thresholds $T^{\uparrow}$, $T^{\downarrow}$ can be any appropriate value. For instance, one or both of the predefined thresholds $T^{\uparrow}$, $T^{\downarrow}$ can be predetermined values, e.g., set by an administrator or an administrator system. One or both of the predefined thresholds $T^{\uparrow}$, $T^{\downarrow}$ can be based on the data, data type, data range, or any combination of these, included in the data set $D_i$. The initial values of the predefined thresholds $T^{\uparrow}$, $T^{\downarrow}$ can be the same, e.g., a value of 100, or different values.

The scales $s^{\uparrow}$, $s^{\downarrow}$ can have any appropriate value. The scales $s^{\uparrow}$, $s^{\downarrow}$ can be set by an administrator or administrator system. The scales $s^{\uparrow}$, $s^{\downarrow}$ can be the same value or different values. In some examples, the upper scale $s^{\uparrow}$ can be 1.2 and the lower scale $s^{\downarrow}$ can be 0.8.

In some implementations, the record value $\tau_i$ can be a default bound. For instance, if the central system 108 receives recommendations to both increase and decrease the current bound for a time period, and for a device, the central system can determine to use the default bound $\tau_i$. For example, the central system 108 can determine that the receipt of two positive recommendations are an invalid attempt to change the bounds and use the default bound $\tau_i$.

In Table 4, below, "Lap" can represent a Laplace operator. The Laplace operator can be for a Laplace distribution. The Laplace distribution can have a zero mean and a scale parameter. The scale parameter can be represented by $\mu=0$ and $b=4k/\varepsilon$.

TABLE 3

UpdateBoundSVT Bound Generation Process

```
Input: Data set D_i
Parameter: Privacy budget ε; threshold: maximum number of bound update recommendations k_2; threshold T↑, T↓; scales s↑, s↓
Output: The contribution bound r_i
Global Variable: noisy threshold T̃↑, T̃↓; the number of reports count↑, count↓; previous bounds: bound_list
Split ε into ε↑ = ε↓ = ε/2
τ_i = mean(bound_list[−k_2:])
q_i↑ = NumAbove(D_i, τ_i)
(is_up, count↑, T̃↑) = CheckUpdate(q_i↑, ε↑, count↑, k_2, T̃↑, T↑)
q_i↓ = NumAbove(D_i, τ_i) − NumAbove(D_i, τ_i * s↓)
(is_down, count↓, −T̃↓) = CheckUpdate(q_i↓, ε↓, count↓, k_2, −T̃↓, −T↓)
if is_up == is_down then
    r_i = τ_i
else if is_up then
    r_i = τ_i * s↑
else if is_down then
    r_i = τ_i * s↓
end if
bound_list.append(r_i)
Return r_i
```

TABLE 4

CheckUpdate

```
Input: Query q_i; Privacy budget ε; number of bound update recommendations count; maximum number of bound update recommendations k_2; noisy threshold T̃; true threshold T
Output: update recommendation update; number of reports count; noisy threshold T̃
update = False
if count < k then
    Get noisy query: q̃_i = q_i + Lap(4k/ε)
    if q̃_i > T̃ then
        update = True
        count = count + 1
        T̃ = T + Lap (2/ε)
    end if
else
    Stop because maximum reports reached
end if
Return (update, count, T̃)
```

After determining how to update the bound c using one or more bound generation processes, e.g., by the bound generation selection engine 124, the bound generation execution engine 126 can generate an updated bound c, determine whether to update the bound, or both, using the selected bound generation process. The central system 108 can use the bound to add noise data to a query response x, generating noise data $\tilde{x}[i]$.

The central system 108 can generate a responsive data set using the noise data. For instance, the central system 108 can determine the devices that generated corresponding action data 112 that is responsive to the query $q_j$ received from one of the downstream systems A-C 110_a-c_. The central system 108 can use the corresponding noise data $\tilde{x}[i]$ for these devices to generate the responsive data set. The central system 108 can transmit the responsive data set, that includes at least some of the noise data $\tilde{x}[i]$, to the downstream system from which the central system 108 received the corresponding query $q_j$. In implementations in which the query $q_j$ indicates a different system that should receive the responsive data set, whether in addition to or instead of the downstream system that provided the query $q_j$ to the central system 108, the central system 108 can transmit the responsive data set to that different system.

By processing the action data 112 on a device level, e.g., covering all event-level records for the device, instead of event-level actions, e.g., for multi-touch attribution processes, the central system 108 can generate the responsive data set that has higher privacy, security, or both, guarantees than other systems, e.g., that process data at the event level. Some examples of events can include clicking on a link or an advertisement, a view, or a conversion. When any one of the downstream systems A-C 110*a-c* receives the responsive data set, the downstream systems A-C 110*a-c* can process at least some of the responsive data set. The processing of the responsive data by the downstream systems A-C 110*a-c* can be more accurate given the device level processing, e.g., device level differential privacy.

The central system 108 is an example of a system implemented as computer programs on one or more computers in one or more locations, in which the systems, components, and techniques described in this specification are implemented. The client devices A-C 102*a-c* can include personal computers, mobile communication devices, and other devices that can send and receive data over a network 128. The network 128, such as a local area network ("LAN"), wide area network ("WAN"), the Internet, or a combination thereof, connects the client devices A-C 102*a-c*, the central system 108, and the downstream systems A-C 110*a-c*. The central system 108 can use a single computer or multiple computers operating in conjunction with one another, including, for example, a set of remote computers deployed as a cloud computing service.

The central system 108 can include several different functional components, including the bound generation selection engine 124 and the bound generation execution engine 126. Any one or more of the components can include one or more data processing apparatuses, can be implemented in code, or a combination of both. For instance, each of the components can include one or more data processors and instructions that cause the one or more data processors to perform the operations discussed in this specification.

The various functional components of central system 108 can be installed on one or more computers as separate functional components or as different modules of a same functional component. For example, the components can be implemented as computer programs installed on one or more computers in one or more locations that are coupled to each through a network. In cloud-based systems for example, these components can be implemented by individual computing nodes of a distributed computing system.

Figure 2:
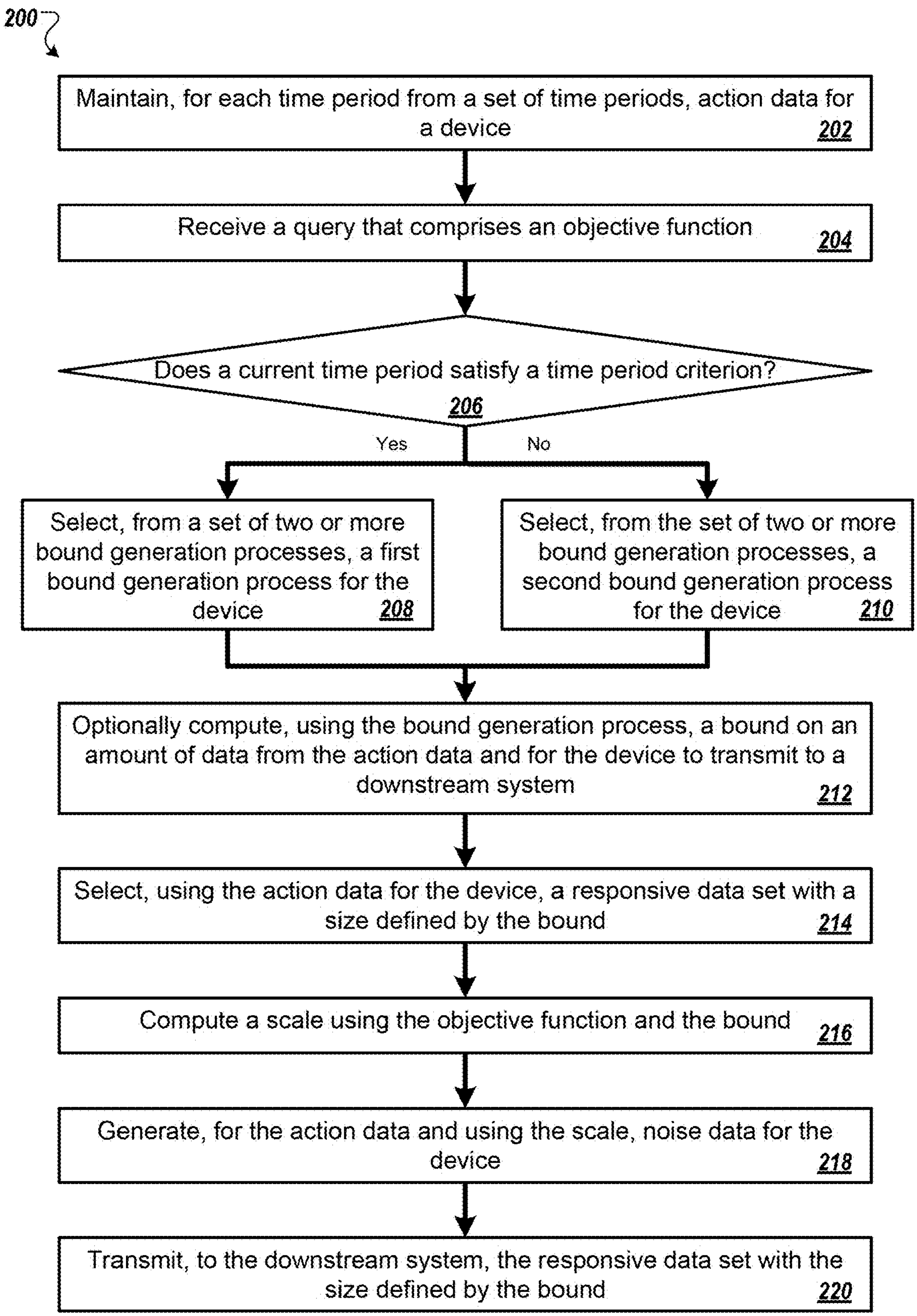
FIG. 2 is a flow diagram of an example process for updating a bound for bounded differential privacy contributions.

FIG. 2 is a flow diagram of an example process 200 for updating a bound for bounded differential privacy contributions. For example, the process 200 can be used by the central system 108 from the environment 100.

A system maintains, for each time period from a set of time periods, action data for a device (202). For instance, the system can receive action data from multiple devices, including the device, and store the action data in one or more databases. The system can then maintain the action data in the database.

The system receives a query that comprises an objective function (204). For example, the system can receive the query from a first downstream system. The message that includes the query can include any appropriate type of data, e.g., instead of or in addition to the objective function. The message can include a duration for the query, indicate time periods included in the duration, or both.

The system determines whether a current time period satisfies a time period criterion (206). For instance, the system can use a result of this determination to select, from a set of two or more bound generation processes, a bound generation process. The system can use the current time period, from the duration for the query, e.g., a privacy budget duration, to select the bound generation process because the system can use a first bound generation process during the initial time periods of the duration and a second bound prediction process during the latter time periods of the duration. Since the first bound generation process consumes more of the privacy budget, the system might not be able to use the first bound generation process throughout the duration as that could consume the privacy budget too quickly. As a result, the system can use the second bound generation process, that consumes less of the privacy budget than the first bound generation process, during the latter time periods. The system can use the first bound generation process that consumes more of the privacy budget initially, instead of the second bound generation process, to get more accurate initial bounds for the process 200. In Table 1, above, this operation can be represented by line 6.

The system selects, from a set of two or more bound generation processes, a first bound generation process for the device (208). The system can select the first bound generation process in response to determining that the current time period satisfies the time period criterion, e.g., is less than the time period criterion $k_1$. In Table 1, above, this operation can be represented by line 7.

The system can perform the first bound generation process using data for the device or multiple devices. For instance, when performed for multiple devices, the system can, for each device in a plurality of devices for which an action data database maintains a corresponding action data set, compute a number of records in the corresponding action data set. The system can compute, for at least some devices from the plurality of devices, a probability using the number of records for the corresponding device and a second number of records for a different device from the plurality of devices. The system can determine, using the probability and for the device, whether to sample a different number of records for a different device or the number of records. The system can select, as the bound on the amount of data from the action data to transmit to the downstream system, the number of records or the different number of records using a result of the determination whether to sample the different number of records for the different device. When performing these operations for a single device, e.g., the device, the system can perform the respective operations that apply for a single device, e.g., as described elsewhere in this specification.

In some instances, computing the probability can use the number of records for the corresponding device, the second number of records for a different device from the plurality of devices, and a quantile percent value. In Table 2, above, this operation can be represented by lines 10 and 11.

In some implementations, determining, using the probability and for the device, whether to sample the different number of records for the different device or the number of records can be represented by line 13 in Table 2, above. This operation can include determining to not sample the different number of records for the different device. This operation can include determining to sample the different number of records for the different device or the number of records. Depending on a result of the determination whether to sample, the system can selecting, as the bound on the amount of data from the action data to transmit to the downstream system, the number of records for the device or uniformly sample the different number of records for the different device or the number of records for the device.

The system selects, from the set of two or more bound generation processes, a second bound generation process for the device (210). For example, in response to determining that the current time period does not satisfy the time period criterion, e.g., is equal or greater to the time period criterion $k_1$, the system can select the second bound generation process. In Table 1, above, this operation can be represented by line 9.

In some implementations, this can include the system computing, using at least the current bound, an average number of records in the action data for the device across a plurality of time period from the set of time periods. The system can compute a number of devices with a corresponding number of records for the current time period that satisfies the average number of records. The system can determine whether to recommend an increase change to the bound using at least the threshold, the noisy threshold, and the number of devices. The system can determine whether to recommend a decrease change to the bound using at least the threshold, the noisy threshold, and the number of devices. This can include performing one or more operations described with reference to Table 3, above, e.g., lines 6, 7, 8, 9, and 10.

In some examples, the system can determine whether a current number of changes to the bound satisfies a bound change threshold. The system can determine to recommend changing the bound or recommend not changing the bound using a result of the determination whether the current number of changes to the bound satisfies the bound change threshold. This can include performing one or more operations described with reference to Table 4, above, e.g., lines 4, 6, and 7, optionally including one or more of lines 5, 8, or 9.

The system optionally computes, using the bound generation process, a bound on an amount of data from the action data and for the device to transmit to a downstream system (212). For instance, after selecting the corresponding bound generation process, the system can execute the selected bound generation process. Execution of the bound generation process can include determining whether to compute, computing, or both, the bound on the amount of data from the action data to transmit to the downstream system. In Table 1, above, this operation can be represented by line 7 or 9. For example, during a first execution of the process 200 or a portion of the process 200 for a device, the system can execute the first bound generation process, e.g., perform the operations represented by line 7. In at least some subsequent executions of the process 200 or a portion of the process 200 for the device, the system can execute the second bound generation process, e.g., perform the operations represented by line 9.

The system selects, using the action data for the device, a responsive data set with a size defined by the bound (214). The system can perform any appropriate process to select data from the action data for the device. The selected data can be sequential data or non-sequential data. The system can randomly select the data from the action data.

The selected data can form the responsive data set or be used to generate the responsive data set, e.g., along with noise data. For instance, when generating noise data, the system can select an initial data set, e.g., as represented by the operations for line 12 in Table 1, above. The system can then add noise data to the initial data set to form the responsive data set, e.g., as described with respect to operation 218 below.

The system computes a scale using the objective function and the bound (216). The system can compute the scale using any appropriate process. In Table 1, above, this operation can be represented by line 13. For instance, the system can compute an updated scale using the objective function, when such an objective function exists, and the bound.

The system generates, for the action data and using the scale, noise data for the device (218). The system can generate the noise data using any appropriate process. In Table 1, above, this operation can be represented by line 14.

In some implementations, the system can update a database that maintains potentially responsive data with the noise data. By updating the database, if the system transmits some of the action data to multiple different downstream systems, e.g., in response to different queries, the system can provide the same noise data, e.g., increasing data privacy, data security, or both.

The system transmits, to the downstream system, the responsive data set with the size defined by the bound (220). The system can use any appropriate transmission protocol to transmit the responsive data set. The responsive dataset can include the noise data, have a size defined by the bound, or both. By having a size defined by the bound, the system can send at most a number of records from the action data that is a value of the bound. In instances in which the action data has fewer records than the value of the bound, the system would send those fewer records, which can include noisy data replacing some of the records, in addition to true value records, or both. In Table 1, above, this operation can include the operation represented by line 15 for generation of the responsive data set.

The order of operations in the process 200 described above is illustrative only, and updating the bound for bounded differential privacy contributions can be performed in different orders. For example, the process 200 can perform operation 204 and then operation 202, or perform both operations substantially concurrently. In some instances, the process 200 can include operation 216 before operation 214, or both operations substantially concurrently.

In some implementations, the process 200 can include additional operations, fewer operations, or some of the operations can be divided into multiple operations. For example, the process 200 can include operations 202, 206, 208 or 210, optionally 212, 214, and 220. The description of operation 212 can be optional since some executions of the second bound generation process might not update the bound, e.g., reducing use of the privacy budget. After the initial execution of the process 200, subsequent executions can include operations 206, 208 or 210, optionally 212, 214, and 220 for the latter time period. The initial execution of the process 200 can include operation 204. Any execution of the process 200 can optionally include one or both of operations 216 or 218.

For situations in which the systems discussed here collect personal information about people, or may make use of personal information, the people may be provided with an opportunity to control whether programs or features collect personal information (e.g., information about a person's activities, a person's preferences, or a person's current location), or to control whether and/or how the system operates. In addition, certain data may be anonymized in one or more ways before it is stored or used, so that personally identifiable information is removed. For example, a person's identity may be anonymized so that no personally identifiable information can be determined for the person, or a person's geographic location may be generalized where location information is obtained (such as to a city, ZIP code, or state level), so that a particular location of a person cannot be determined. Thus, the person may have control over how information is collected about him or her and used.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" is used broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

Operations can occur substantially concurrently in that the operations need not be exactly concurrent but can overlap at least in part. For instance, a first operation can begin and sometime after that a second operation can begin while the first operation is still occurring. Execution of the two operations, whether by the same system or different systems, can be substantially concurrently. In some examples, two operations can execute substantially concurrently when they have the same start time, same end time, or both.

In this specification, the term likely can mean that there is a likelihood that something might occur and that likelihood satisfies a likelihood threshold. For instance, when determining whether one option is likely better than another, a system would determine, for each of the options, a likelihood of the respective option improving processing, e.g., data privacy, data security, or both. The system would then determine whether the likelihood satisfies, e.g., is greater than or equal to, a likelihood threshold by comparing the two values. When considering two options, the system can determine whether a first likelihood for a first option satisfies, e.g., is greater than, a second likelihood for a second option. If so, the system determines that the object is likely depicted in the image. If not, the system determines that the object is not likely depicted in the image.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Figure 3:
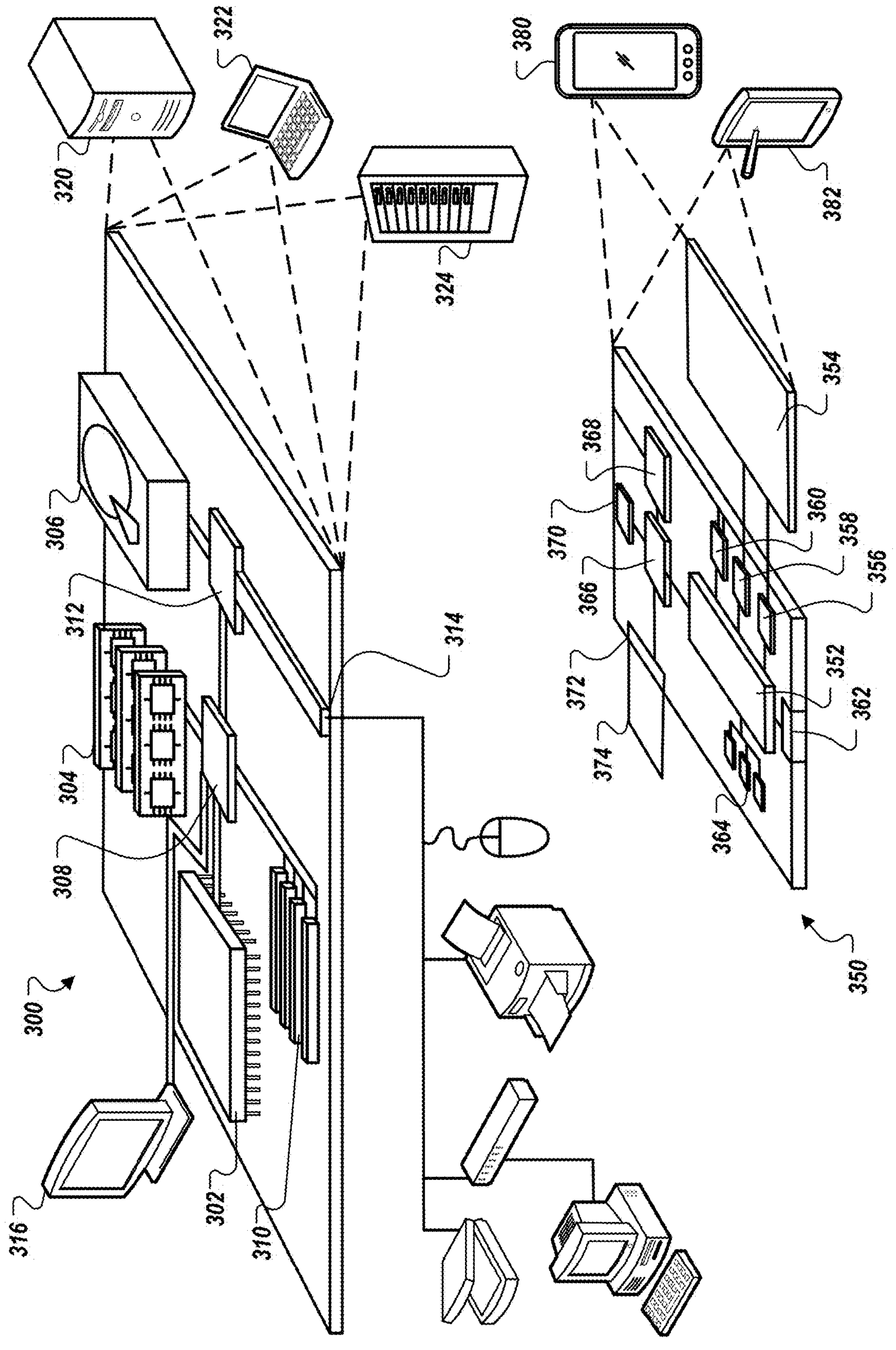
FIG. 3 is a block diagram of a computing system that can be used in connection with computer-implemented methods described in this specification.

FIG. 3 is a block diagram of computing devices 300, 350 that may be used to implement the systems and methods described in this specification, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 300 includes a processor 302, memory 304, a storage device 306, a high-speed interface 308 connecting to memory 304 and high-speed expansion ports 310, and a low-speed interface 312 connecting to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380, e.g., a smartphone. In some instances, the computing device 350 may be implemented as a tablet 382. Other types of the computing device 350 can include an extended reality device, e.g., an augmented reality device or a virtual reality device, a personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In some implementations, when a device or system transmits data to another device or system, the transmission of the data, such as a message, can cause the other device or system to perform one or more actions. For instance, transmission of a message that includes an instruction to a camera can cause the camera to capture one or more images, transmit one or more images to the device or system, or a combination of both.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

What is claimed is:

1. A system comprising one or more computers and one or more storage devices on which are stored instructions that are operable, when executed by the one or more computers, to cause the one or more computers to perform operations comprising:

maintaining, for each time period from a set of time periods, action data for a device;

determining whether a current time period satisfies a time period criterion;

selecting, using a result of the determination whether the time period criterion is satisfied and from a set of two or more bound generation processes, a bound generation process for the device, the bound generation process configured to compute a maximum bound on an amount of data transmitted for the device to a downstream system;

computing, using the bound generation process, a bound on an amount of data from the action data and for the device to transmit to time the downstream system, the bound being smaller than a total size of the action data for the device;

selecting, using the action data for the device, a responsive data set with a size defined by the bound, the responsive data set including noise data for the device; and transmitting, to the downstream system, the responsive data set with the size defined by the bound.

2. The system of claim 1, the operations comprising:

receiving a query that comprises an objective function;

computing a scale using the objective function and the bound; and generating, for the action data and using the scale, the noise data for the device, wherein:

selecting the responsive data set comprises selecting the data set from a combination of the action data for the device and the noise data for the device.

3. The system of claim 2, wherein:

receiving the query comprises receiving, from the downstream system and prior to receiving the action data for the device, the query that comprises the objective function and a duration for use of the objective function, the duration including the set of time periods; and transmitting the responsive data set with the size defined by the bound comprises transmitting, to the downstream system and for the current time period from the set of time periods, the responsive data set that includes the noise data for the device as part of a continuous stream of data to the downstream system that is responsive to the query.

4. The system of claim 2, wherein at least some of the action data for the device comprises data generated by the device given interactions with different applications, websites, or both.

5. The system of claim 1, wherein computing the bound on the amount of data from the action data to transmit to the downstream system comprises:

computing a number of records in a corresponding action data set;

determining whether the number of records satisfies a maximum number of records; and selecting, as the bound on the amount of data from the action data to transmit to the downstream system, the number of records or the maximum number of records using a second result of the determination whether the number of records satisfies the maximum number of records.

6. The system of claim 1, wherein:

computing the bound on the amount of data from the action data to transmit to the downstream system comprises:

for each device in a plurality of devices for which an action data database maintains a corresponding action data set, computing a number of records in the corresponding action data set, wherein the plurality of devices comprises the device and the action data database includes the action data;

computing, for at least some devices from the plurality of devices, a probability using the number of records for the corresponding device and a second number of records for a different device from the plurality of devices;

determining, using the probability and for the device, whether to sample a different number of records for a different device or the number of records; and selecting, as the bound on the amount of data from the action data to transmit to the downstream system, the number of records or the different number of records using a second result of the determination whether to sample the different number of records for the different device.

7. The system of claim 6, wherein computing the probability uses the number of records for the corresponding device, the second number of records for a different device from the plurality of devices, and a quantile percent value.

8. The system of claim 6, wherein:

determining, using the probability and for the device, whether to sample the different number of records for the different device or the number of records comprises determining to not sample the different number of records for the different device; and selecting the number of records or the different number of records comprises selecting, as the bound on the amount of data from the action data to transmit to the downstream system, the number of records in response to determining to not sample the different number of records for the different device.

9. The system of claim 6, wherein:

determining, using the probability and for the device, whether to sample the different number of records for the different device or the number of records comprises determining to sample the different number of records for the different device or the number of records; and selecting, as the bound on the amount of data from the action data to transmit to the downstream system, the number of records or the different number of records comprises uniformly sampling the different number of records or the number of records in response to determining to sample the different number of records for the different device or the number of records.

10. The system of claim 1, wherein computing the bound on the amount of data from the action data to transmit to the downstream system comprises:

using a threshold, a noisy threshold, and a current bound, determining whether to compute a new bound instead of using the current bound; and selectively using the current bound or the new bound using a second result of the determination whether to compute the new bound instead of using the current bound.

11. The system of claim 10, wherein the threshold indicates a maximum number of bound update recommendations.

12. The system of claim 10, the operations comprising:

computing, using at least the current bound, an average number of records in the action data for the device across a plurality of time periods from the set of time periods;

computing a number of devices with a corresponding number of records for the current time period that satisfies the average number of records;

determining whether to recommend an increase change to the bound using at least the threshold, the noisy threshold, and the number of devices; and determining whether to recommend a decrease change to the bound using at least the threshold, the noisy threshold, and the number of devices, wherein:

determining whether to compute the new bound instead of using the current bound uses a third result of the determination of whether to recommend an increase change to the bound and a fourth result of the determination whether to recommend a decrease change to the bound.

13. The system of claim 12, wherein:

determining whether to compute the new bound instead of using the current bound comprises determining that the third result has the same value as the fourth result; and selectively using the current bound or the new bound comprises selecting the average number of records in the action data for the device as the new bound.

14. The system of claim 12, wherein:

determining whether to compute the new bound instead of using the current bound comprises determining, using a third value and a fourth value, to compute the new bound by increasing the bound; and selectively using the current bound or the new bound comprises computing the new bound using the average number of records in the action data for the device and a scale value greater than one.

15. The system of claim 12, wherein:

determining whether to compute the new bound instead of using the current bound comprises determining, using a third value and a fourth value, to compute the new bound by decreasing the bound; and selectively using the current bound or the new bound comprises computing the new bound using the average number of records in the action data for the device and a scale value less than one.

16. The system of claim 12, wherein determining whether to recommend an increase change to the bound or determining whether to recommend a decrease change to the bound comprises:

determining whether a current number of changes to the bound satisfies a bound change threshold; and determining to recommend changing the bound or recommend not changing the bound using a fifth result of the determination whether the current number of changes to the bound satisfies the bound change threshold.

17. The system of claim 12, wherein determining whether to recommend an increase change to the bound or determining whether to recommend a decrease change to the bound comprises:

determining whether a noisy query satisfies a threshold; and determining to recommend changing the bound or recommend not changing the bound using a fifth result of the determination whether the noisy query satisfies the threshold.

18. The system of claim 12, wherein determining whether to recommend an increase change to the bound or determining whether to recommend a decrease change to the bound uses at least part of a privacy budget.

19. One or more computer storage media encoded with instructions that, when executed by one or more computers, cause the one or more computers to perform operations comprising:

maintaining, for each time period from a set of time periods, action data for a device;

determining whether a current time period satisfies a time period criterion;

selecting, using a result of the determination whether the time period criterion is satisfied and from a set of two or more bound generation processes, a bound generation process for the device, the bound generation process configured to compute a maximum bound on an amount of data transmitted for the device to a downstream system;

computing, using the bound generation process, a bound on an amount of data from the action data and for the device to transmit to the downstream system, the bound being smaller than a total size of the action data for the device;

selecting, using the action data for the device, a responsive data set with a size defined by the bound, the responsive data set including noise data for the device; and transmitting, to the downstream system, the responsive data set with the size defined by the bound.

20. A computer-implemented method comprising:

maintaining, for each time period from a set of time periods, action data for a device;

determining whether a current time period satisfies a time period criterion;

selecting, using a result of the determination whether the time period criterion is satisfied and from a set of two or more bound generation processes, a bound generation process for the device, the bound generation process configured to compute a maximum bound on an amount of data transmitted for the device to a downstream system;

computing, using the bound generation process, a bound on an amount of data from the action data and for the device to transmit to the downstream system, the bound being smaller than a total size of the action data for the device;

selecting, using the action data for the device, a responsive data set with a size defined by the bound, the responsive data set including noise data for the device; and transmitting, to the downstream system, the responsive data set with the size defined by the bound.

* * * * *